(12) United States Patent
Roth et al.

(10) Patent No.: US 11,429,980 B1
(45) Date of Patent: Aug. 30, 2022

(54) SECURE PURCHASE VERIFICATION FOR FUND TRANSFERS

(71) Applicant: UIPCO, LLC, San Antonio, TX (US)

(72) Inventors: Valerie Ann Roth, San Antonio, TX (US); Charise Renee Whitaker, San Antonio, TX (US); Oscar Guerra, San Antonio, TX (US); Ashley Raine Philbrick, San Antonio, TX (US); Paula Ann Whittington, Helotes, TX (US); Kelly Q. Baker, San Antonio, TX (US); Will Kerns Maney, Jr., San Antonio, TX (US); Sumita T. Jonak, San Antonio, TX (US); Pragya Kamal, Phoenix, AZ (US); Ryan Thomas Russell, San Antonio, TX (US); Joel S. Hartshorn, Liberty Lake, WA (US)

(73) Assignee: United Services Automobile Association (USAA), San Antonio, TX (US)

( * ) Notice: Subject to any disclaimer, the term of this patent is extended or adjusted under 35 U.S.C. 154(b) by 178 days.

(21) Appl. No.: 16/728,964

(22) Filed: Dec. 27, 2019

(51) Int. Cl.
*G06Q 20/42* (2012.01)
*G06Q 20/22* (2012.01)
*G06Q 20/40* (2012.01)
*G06Q 40/02* (2012.01)

(52) U.S. Cl.
CPC ....... *G06Q 20/425* (2013.01); *G06Q 20/2295* (2020.05); *G06Q 20/4015* (2020.05); *G06Q 20/4033* (2013.01); *G06Q 20/40145* (2013.01); *G06Q 40/02* (2013.01)

(58) Field of Classification Search
CPC ............ G06Q 20/425; G06Q 20/4015; G06Q 20/2295; G06Q 20/40145; G06Q 20/4033
See application file for complete search history.

(56) References Cited

U.S. PATENT DOCUMENTS

| 5,884,290 A | 3/1999 | Smorodinsky et al. |
| 8,249,986 B2 | 8/2012 | Scipioni et al. |
| (Continued) | | |

FOREIGN PATENT DOCUMENTS

JP 2013080495 A 5/2013

OTHER PUBLICATIONS

Non-Final Office Action dated Apr. 28, 2021 for U.S. Appl. No. 16/729,003.

(Continued)

*Primary Examiner* — Patrick McAtee
*Assistant Examiner* — Terry Nathan Murray
(74) *Attorney, Agent, or Firm* — Plumsea Law Group, LLC

(57) ABSTRACT

A method and system of increasing the security of requests to access funds from a joint bank account by secondary users in order to permit a primary user to securely regulate fund usage are disclosed. The system and method are configured to link to a bank account and restrict the access of funds by secondary users per conditions defined by the primary user(s). An application can be accessed via a computing device that receives requests for funds from secondary users and requires the secondary user to also submit a digital image or video that supports their proposed transaction. The request will only be conveyed to the primary user if the necessary digital verification is received by the system.

20 Claims, 14 Drawing Sheets

(56) References Cited

U.S. PATENT DOCUMENTS

| | | | |
|---|---|---|---|
| 2003/0197058 A1* | 10/2003 | Benkert | G06Q 20/385 235/380 |
| 2012/0030109 A1 | 2/2012 | Dooley et al. | |
| 2012/0296818 A1 | 11/2012 | Nuzzi et al. | |
| 2014/0095383 A1* | 4/2014 | Rao | G06Q 20/385 705/43 |
| 2015/0046990 A1* | 2/2015 | Oberheide | G06F 21/45 726/6 |
| 2015/0347769 A1* | 12/2015 | Espinosa | G06F 21/62 726/28 |
| 2018/0075061 A1 | 3/2018 | Purumala et al. | |
| 2018/0204205 A1 | 7/2018 | Giraudo et al. | |
| 2018/0293553 A1* | 10/2018 | Dembo | G06Q 20/0655 |
| 2018/0365676 A1 | 12/2018 | Studnicka | |
| 2019/0161190 A1* | 5/2019 | Gil | G01S 19/15 |
| 2021/0264524 A1* | 8/2021 | Knarr | G06Q 40/08 |

OTHER PUBLICATIONS

Non-Final Office Action dated Aug. 16, 2021 for U.S. Appl. No. 16/729,049.

B. Shivhare et al., "Using Geo-location method for lost node in location based services", 2015 International Conference on Communication Networks (ICCN), 2015, pp. 356-360, doi: 10.1109/ICCN.2015.68 (Year: 2015).

Notice of Allowance dated Jan. 18, 2022 for U.S. Appl. No. 16/729,049.

Final Office Action dated Oct. 26, 2021 for U.S. Appl. No. 16/729,003.

* cited by examiner

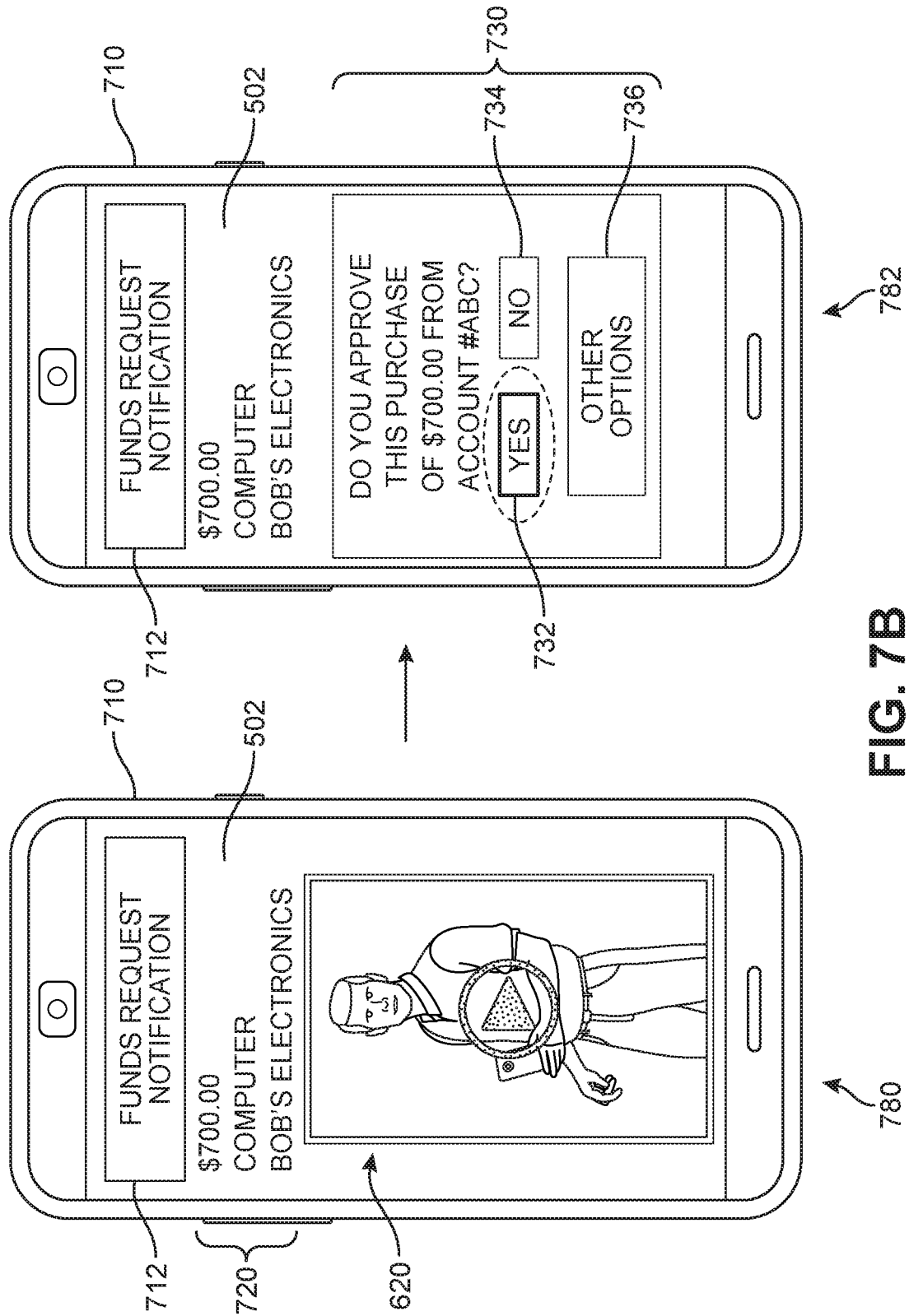

SECURE PURCHASE VERIFICATION FOR FUND TRANSFERS

TECHNICAL FIELD

The present disclosure generally relates to a method and system for requesting access to and receiving approval for funds in a shared account for a specific purchase, and specifically to a method and system for ensuring such requests are verified prior to the release of funds by use of a secure message providing an image or video related to the proposed purchase to the approving party.

BACKGROUND

Financial account management tools have become an increasingly important resource for the average consumer. Financial services, particularly those now available for use via computing devices, can provide consumers the versatility and freedom to control their assets and credit. However, consumers with many different financial accounts, such as credit card accounts, utility accounts, mortgage accounts, etc., may have trouble keeping current with account balances, payments and other transactions. The consequences of mis-management may result in penalties being assessed against the consumer by the providing the accounts. For example, penalties may be associated with late payments or balance thresholds that are exceeded by a consumer. This type of issue is exacerbated when the account is co-held (e.g., a joint banking account) and one account holder incurs expenses that the other account holder is unaware of, at least until some time has passed following the transaction. For example, couples or parent-child account members may use a joint bank account and have joint credit or debit card accounts, whereby each person in the group individually draws on the same account and independently charges purchases to the joint account. If prompt communication regarding each purchase is not provided to the other members of the group, the charges may reach the credit card limit and/or the account may become overdrawn.

Thus, the costs associated with failures to communicate these payments to all account holders can be significant. Furthermore, in cases of a joint account in which one person is a guardian or the "primary owner" (such as a parent) and the other is a dependent or a "secondary owner" (such as a child), the primary owner can have a strong interest in reviewing some or all financial transactions related to the joint financial transactions in order to monitor expenditures and ensure that money is spent according to a proposed budget or other their personal expectations. Conventional methods of managing financial activities of other account holders (e.g., a joint bank account) do not provide a fine level of control or granularity for the primary owner to customize and personalize their expectations and limits of account-related financial activities. Furthermore, it is imperative that such controls occur in a secure environment, to deter fraudulent attempts at obtaining the funds.

There is a need in the art for a system and method that addresses the shortcomings discussed above.

SUMMARY

In one aspect, a method of increasing security of requests for access to funds held in a bank account is disclosed. The method includes receiving, from a first user of a first device, a first request for use of a first amount of the funds by the first user during a first transaction at a first location, and then causing, in response to receiving the first request, a first message to be presented to the first user at the first device requesting at least a first digital verification item. The method also includes receiving, from the first device, the first digital verification item, and transmitting at least the first request and first digital verification item to a second user at a second device. The method further comprises receiving a first approval of the first request from the second device, and automatically authorizing a release of the first amount of the funds for use by the second user in response to receiving the first approval and authenticating the identity of the first user.

In another aspect, a system for increasing security of requests for access to funds held in a bank account includes a processor and machine-readable media. The machine-readable media include instructions which, when executed by the processor, cause the processor to receive, from a first user of a first device, a first request for use of a first amount of the funds by the first user during a first transaction at a first location, as well as cause, in response to receiving the first request, a first message to be presented to the first user at the first device requesting at least a first digital verification item. The instructions further cause the processor to receive, from the first device, the first digital verification item, and then to transmit at least the first request and first digital verification item to a second user at a second device. In addition, the instructions cause the processor to receive a first approval of the first request from the second device, and automatically authorize a release of the first amount of the funds for use by the second user in response to receiving the first approval and authenticating the identity of the first user.

In another aspect, a system of increasing security of requests for access to funds held in a bank account includes means for receiving, from a first user of a first device, a first request for use of a first amount of the funds by the first user during a first transaction at a first location, as well as means for causing, in response to receiving the first request, a first message to be presented to the first user at the first device requesting at least a first digital verification item. The system also includes means for receiving, from the first device, the first digital verification item, and means for transmitting at least the first request and first digital verification item to a second user at a second device. In addition, the system includes means for receiving a first approval of the first request from the second device, and means for automatically authorizing a release of the first amount of the funds for use by the second user in response to receiving the first approval and authenticating the identity of the first user.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIGS. 7A and 7B depict an example of the primary account member reviewing the fund request message and video-based digital verification item, according to an embodiment;

DETAILED DESCRIPTION

Figure 1A:
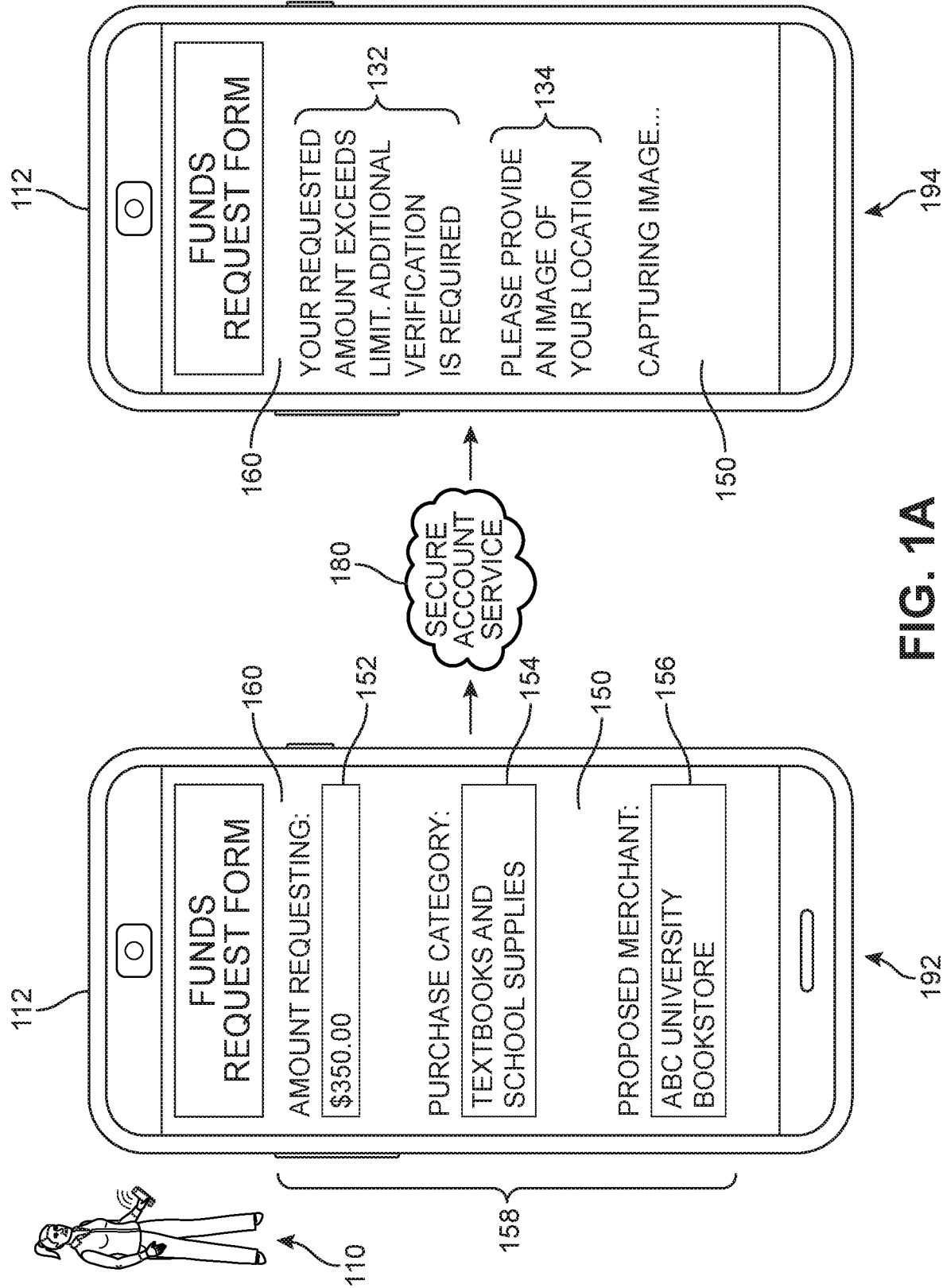
FIGS. 1A and 1B depict an overview of a scenario in which a first account member submits a request for use of funds from a shared account and authenticates the request by the capture of a real-time image, according to an embodiment.

The embodiments provide a method and system for real-time authorization of purchases or other retail or account transactions. The proposed system and method take advantage of the growing presence and availability of computing devices in the day-to-day life of the modern consumer, and which have become nearly ubiquitous in most households. As will be discussed below, the proposed systems can enable users of joint banking accounts to make proactive spending decisions by generating dynamic, interactive notifications for some or all transactions before the transactions will be permitted to occur. The notifications can be sent to an authorized "approver" who must review and provide approval in order for the funds to be released. Thus, when a user intends to make a purchase of a type or amount that has been identified as requiring pre-approval, a message can be transmitted to the authorized approver requesting an allocation of funds for the specific item or amount. In addition, the request can include additional content in support of the transaction, such as a photo or video presenting features associated with the purchase, thereby significantly limiting the possibility of fraudulent charges while increasing account security. The approver may then be confident that the proposed use of funds is aligned with the described transaction.

References to various aspects of access management will be discussed throughout the following disclosure, including identification, authentication, and authorization. For purposes of this application, the term 'identification' refers to the process of associating a user with something that has occurred on a server, on a network, or with some other resource, and typically occurs when a user (or any subject) claims or professes an identity. Traditionally, the process of identification can be accomplished with a username, a process ID, a smart card, or anything else that can uniquely identify a subject. Security systems use this identity when determining if a subject can access an object. In addition, the term authentication refers to the process of proving (or verifying) an identity, and typically occurs when subjects provide appropriate credentials to prove their identity. For example, when a user provides the correct password with a username, the password proves that the user is the owner of the username. Thus, the authentication provides proof of a claimed identity. The term identity verification or simply "verification" may also be used interchangeably with authentication. As a general matter, three main methods of authentication include (a) knowledge factors or user knowledge, such as a password or PIN; (b) possession factors, or user possessions, such as a key, smart card, CAC (Common Access Card), PIV card (Personal Identity Verification card), RSA, or other physical card or token, magnetic stripe cards, certificates with a digital signature, etc.; and (c) biometric or inheritance factors, such as voice recognition, retinal and fingerprint scans, etc. In general, any of these types of inputs will be referred to as "authentication factors". The factors that have been stored for purposes of a user identity or account will be referred to as user credentials, and include the knowledge as well as data that allows the various possessions or biometric factors to be correctly recognized and matched.

Furthermore, authorization refers to the concept of allowing access to resources only to those permitted to use them. In other words, authorization is a process that protects resources by only allowing access by consumers that have been granted authority to use or receive them. Some examples of such resources include individual files' or items' data, computer programs, computer devices and functionality provided by computer applications, as well as more tangible resources such as ATMs, banks, vaults, offices, or other spaces with specific security requirements. In addition, the use of the term "secured resources" refers to services, features, or other resources (physical and digital or virtual) that are access-restricted and are designed to be made available only to users that have been authenticated and authorized for such access. The most common usage will be to bank accounts or other instruments offered by financial institutions, but other types of resources such as company or organizational resources, physical objects such as vehicles, can also be managed by the tools as discussed herein. As used herein, a "financial transaction account," also referred to herein as a "transaction account," is a specific type of secured resource that may include a bank account, a credit account, etc. For example, a bank account may refer to a savings account, a checking account, a money-market account, etc. and a credit account may refer to a transaction account associated with a pre-approved line of credit. A transaction refers to any type of action or event that is linked to a use or access of a secured resource.

The term "merchant" refers to any person, entity, distributor system, software, and/or hardware that is a provider or broker of goods/services, and includes any other entity in the distribution chain of goods/services. For example, some common merchant types may include a grocery store, a retail store, a travel agency, a service provider, a public-service utility, a school, a library, an on-line merchant, a government agency, etc. A non-typical merchant may be a host of a garage sale or a host of a fund-raising activity, or other independent sellers. Generally, a consumer may communicate or interact with a traditional merchant in person (e.g., in person at a store), telephonically, or electronically (e.g., from a computer via the Internet).

In addition, references to a "primary" user, owner, account holder, or member refer to a person or entity that is fully authorized to manage and access all aspects of a secured resource. Some non-limiting examples include an employer, parent, supervisor, spouse, or other custodian of a secured resource. In contrast, a "secondary" user, owner, account holder, or member is a person who may be provided access to the secured resource, but whose access is regulated by a primary owner. Some non-limiting examples include a child, dependent, minor, employee, spouse, volunteer, or other person who may need to access the secured resource, but whose usage must be regulated or monitored. An approver is a person who has been given the power to determine whether a transaction or set of transactions or other use of the secured resource is permitted for a specific secondary user.

Finally, the term "digital verification item" refers to any digital content that includes a visual object, such as a digital image or video recording. In some embodiments, the digital verification item may only be generated and obtained following a request for funds by a secondary user. In other words, the digital verification item must be created during a specific window of time after the request has been submitted, to ensure that the image or video accurately represents a physical context or location associated with the transaction that is being requested. In one embodiment, the digital verification item can only be accepted by the system if it is generated by the account management application through which the request was submitted in order to minimize the likelihood of fraudulent images or videos being uploaded or submitted.

While several specific examples of account management methods and systems for co-owned accounts will be described below, it is to be understood that the various aspects and features of each embodiment may be applied to any of the particular applications discussed herein. Thus, in some embodiments, the system may be offered as a stand-alone account management system or as a component of an integrated software solution for account management. In another embodiment, the system can be integrated into existing business and financial processes and products.

Figure 1B:
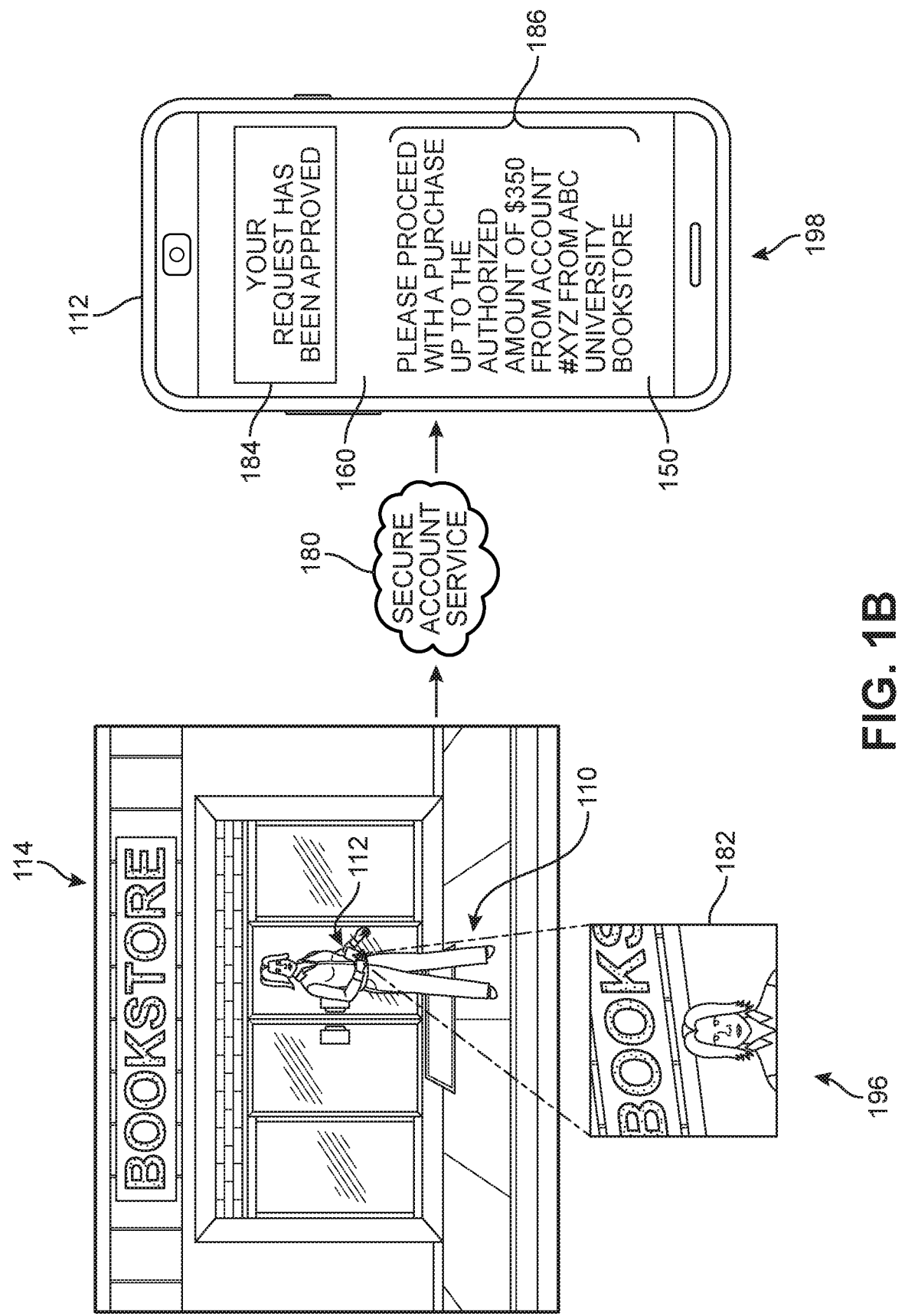

For purposes of clarity, an overview of one embodiment of the proposed systems and methods is illustrated with reference to FIGS. 1A and 1B. In FIG. 1A, an example of a system designed with the goal of securely processing an account transaction approval request and response is depicted. The system is arranged to generate a request to obtain access to a secured resource on behalf of a secondary member of the secured resource, and transmit said request to a primary member or administrator of the secured resource. In this example, an application for an access management system ("system") is configured to receive input(s) 158 from a first user 110 via a request form interface 150 that is being accessed through a funds management application 160 presented via a first computing device ("first device") 112. These inputs 158—in this case, including a first input 152 ("$350") under a first input category "Amount Requesting", a second input 154 ("Textbooks and School Supplies") under a second input category ("Purchase category"), and a third input 156 ("ABC University Bookstore") under a third input category ("Proposed Merchant")—have been entered by the first user 110 into the fields that are provided by the request form interface 150.

Once the required inputs have been entered, as shown in a first step 192 of FIG. 1A, the first user 110 can submit the request, which will be handled by a cloud-based secure account management service ("service") 180 configured to deliver the request to the appropriate account administrator once the appropriate request parameters have been received. In this example, the first user 110 (a dependent daughter) has submitted a request via service 180. In this case, the service 180 then further determines that the amount being requested ($350) is larger than a maximum amount that may be submitted without further verification of the intended transaction. In a second step 194, the request form interface 160 generates a reminder for the first user 110 of the policy by an alert message 132 ("Your requested amount exceeds limit. Additional verification is required"), and instructions 134 ("Please provide an image of your location"). In other words, because the amount approved is greater than a threshold amount pre-selected by the account administrator, in order for the request to be accepted by the system, the first user 110 must now also provide the pre-designated means of authentication (i.e., a digital verification item).

As will be discussed in greater detail below, in different embodiments, the authentication can be provided by the real-time capture of an image associated with the transaction. In this case, the system has been configured to obtain an image of the location in which the first user 110 is currently situated. For example, in some embodiments, the system can be configured to automatically initiate an image capture process ("Capturing image . . . "). In some other embodiments, a "Next" option can be shown during the second step 194 of FIG. 1A to allow the user to manually initiate the image capture when the first user 110 is ready. In FIG. 1B, at a third step 196, after a brief period to allow the first user 110 to prepare for the image capture, the application 160 automatically initiates an image capture in which a camera feature is accessed on the first device 112. In this case, the first user 110 is standing outside of a bookstore 114 corresponding to the merchant from which the proposed transaction was to take place and is able to generate a captured image 182 of herself in front of the bookstore 114. The service 180 receives this image data. In response, the system can process and transmit the request of FIG. 1A along with the captured image 182 to the designated approver. For example, a parent at another location can be presented the request from her daughter. The parent or other approver can receive a message that includes a summary of her daughter's request, as well the captured image 182.

Upon reviewing the proposed transaction, the approver can decide to approve the request. This approval is received by the service 180, which can be configured to process the approval in conjunction with the preestablished account policies and settings and authorize the release of up to $350 on behalf of the first user 110, as shown in a fourth step 198. The first user 110 may receive an approval message 184 ("Your request has been approved") automatically generated in response to the approval, as well as optional transaction details 186 ("Please proceed with a purchase up to the authorized amount of $350 from Account #XYZ from ABC University Bookstore"). Thus, first user 110 is now able to access the desired funds from the joint banking account via a transaction at the bookstore 114.

In the figures depicted, different examples of a user interface ("interface") are presented on a touchscreen display of a mobile device, offering content via native controls included in the interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In some embodiments (not shown in the drawings), the interface can include a welcome or header message(s), and/or a plurality of data input fields can also be presented. Some non-limiting examples of such fields can include options directed to identification of the account owner and other users (e.g., name, phone number, address). In addition, the interface can provide a plurality of selectable options, such as navigation options (e.g., "Back", "Save", "Next"), or additional menu options for accessing other features or aspects of the profile. As a general matter, it should be understood that the text and specific wording shown in the figures are for purposes of illustration only and in no way limit the manner by which the application may communicate or receive information. In addition, in other embodiments, one or more options or other fields and text may appear differently and/or may be displayed or generated anywhere else on the screen(s) associated with the user's system, including spaced apart from, adjacent to, or around the user interface. In other words, the figures present only one possible layout of the interface, and do not in any way limit the presentation arrangement of any of the disclosed features.

Figure 2A:
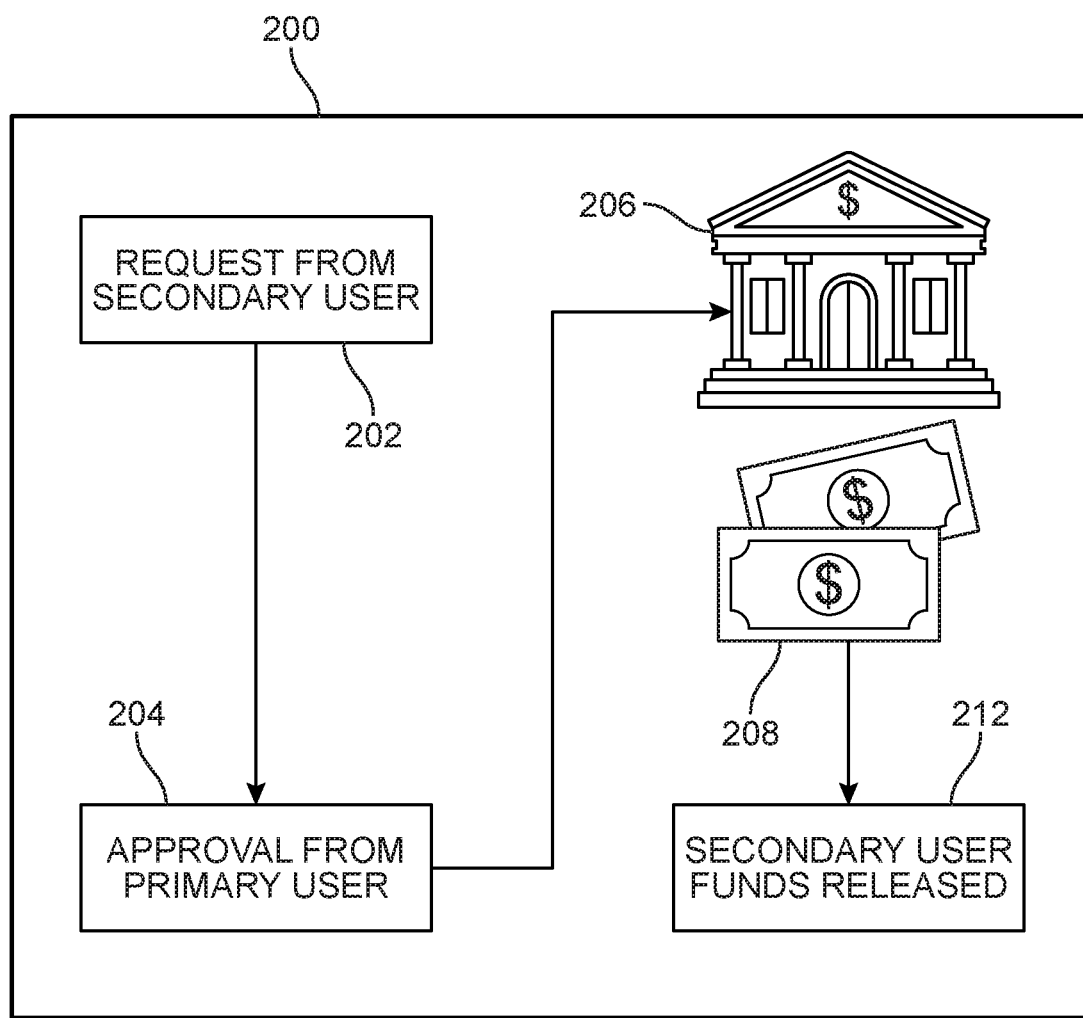
FIGS. 2A and 2B provide an overview of an architecture of an account management system, according to an embodiment.

An overview of an embodiment of an account management system flow 200 is depicted in FIG. 2A. The flow 200 includes four general stages. As seen in FIG. 2A, a first stage 202 includes the generation of a request for use of a particular amount of funds from a secondary user. The request is submitted to the system and processed for presentation to a primary user, who can choose to provide approval of the request in a second stage 204. This approval causes a sequence of processes to occur through which the approved amount 208 is released from the shared bank account in a third stage 206. Finally, the secondary user can receive and use the funds in a fourth stage 212.

Figure 2B:
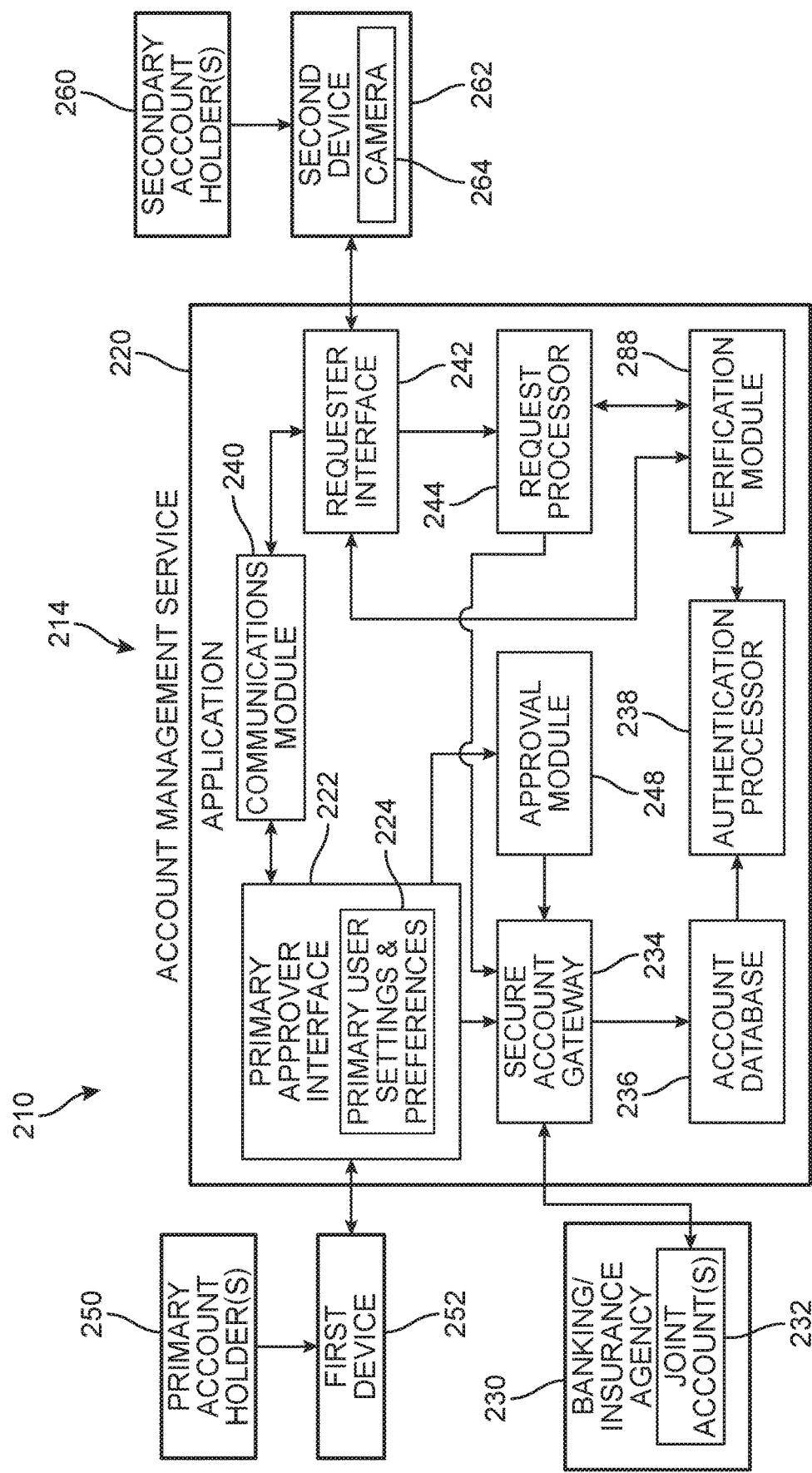

Referring now to FIG. 2B, a schematic diagram representing the architecture of one embodiment of an account management system ("architecture") 210 is illustrated. As shown in FIG. 2, the architecture 210 includes a first computing device ("first device") 252 that for purposes of illustration will be used by primary account holder(s) 250, and a second computing device ("second device") 262 that for purposes of illustration will be used by secondary account holder(s) 260. The devices can access and make use of an account management service platform ("service") 214 that works in conjunction with a fund management application ("application") 220 that can be configured to release funds for use by a secondary user from a registered joint account 232 associated with a bank, insurance agency, or other financial institution 230 (or other secured resource) when approval of a specific request is received.

The primary account holder 250 can enroll his or her secured resource, such as a bank account, for management through platform 214. Thus, in some embodiments, the financial institution 230 can be configured to connect and/or facilitate the flow of information associated with the joint account 232 via a secure account gateway ("gateway") 234 to the platform 214 and receive instructions regarding the joint account 232 through the gateway 234. The primary account holder 250 can register for the service through first device 252 and interact with the application 220 via a primary approver interface 222 which is configured to offer the management tools and features for the selected joint account. The primary account holder 250 can create and modify primary user settings and preferences 224 that will be used to determine the transaction circumstances and context in which an approval will be required, as well as which persons are authorized to provide such approval.

When a secondary account holder 260 intends to make a purchase or attempt some use of a secured resource regulated by the platform 214, in some embodiments, he or she may opt to first review the conditions of such use through a requester interface 242 via second device 262. If the intended transaction falls outside the scope of any controls and conditions identified by the primary account holder 250, the secondary account holder 260 may proceed with the transaction without further delay. If, however, the intended transaction is of a type or amount that matches a pre-defined condition established by the primary account holder 250, the secondary account holder 260 may enter the necessary information about the transaction through requester interface 242 to generate a request for approval of the desired transaction. The request can be received by a request processor 244, which can determine, based on access to information about the current availability of the secured resource and the settings selected by the primary account holder 250, how the request should be handled. In cases in which the proposed transaction has been identified or designated as requiring a type of digital verification item (see FIGS. 3-10 below), the request processor 244 can trigger the functions of a verification module 288 that can work in conjunction with the requester interface 242 to ensure that the appropriate digital verification item is required when a proposed transaction meets specific conditions. For example, when a proposed transaction exceeds a designated 'maximum' amount, the secondary account holder 260 will be presented with a verification interface in which one or more digital verification items will be required before the request may be accepted. In different embodiments, this can entail the access of a camera 264 associated with the second device 262. In some embodiments, an authentication processor 238 can be employed to review the digital verification item(s) for basic features or properties, such as a timestamp, a security code, confirmation of the type of electronic content being received, or other properties. The request will not be transmitted to the primary account holder 250 in such cases unless the requisite digital verification item has been received by the service 214.

A communications module 240 can generate a message or notification regarding the request for presentation to the designated approver, which may include the primary account holder 250. The request information, along with the digital verification item(s), can be viewed through the primary user interface 222. Submission of an approval response can trigger a release of the requested funds via approval module 248 that coordinates directly with the banking institution 230 to ensure only the approved amount is made available to the secondary account holder 260. In some embodiments, the primary approver interface 222 can allow the primary account holder 250 to require additional or alternate types of verification of the secondary account holder 260, and the approval process will remain pending until the primary account holder 250 is satisfied with the content that has been received and submits an approval.

In different embodiments, the various devices, entities, and modules are configured to communicate with one another, for example via a Wi-Fi, cellular, or other network connection and make use of and receive and share data with platform 214. In some examples, devices can each include various forms of communication devices including, but not limited to, a public switched telephone network (PSTN) telephone, a voice over IP (VoIP) telephone, a video phone, a handheld computer, a cellular telephone, a smart phone, an enhanced general packet radio service (EGPRS) mobile phone, or other appropriate communication devices. The network can include a large network or combination of networks, such as a PSTN, a local area network (LAN), wide area network (WAN), the Internet, a cellular network, a satellite network, one or more wireless access points, or a combination thereof connecting any number of mobile clients, fixed clients, and servers.

While the application 220 and the other various components of platform 214 are shown as residing outside of devices 252, 262, and 272 in FIG. 2B, in other embodiments some or all modules and components described herein can reside locally on a user device 220 and/or a local financial network. In some embodiments, some or all components of platform 214 may be stored at and executed by multiple computing systems, while in another embodiment, these components may be accessed via one or more web-based applications accessed and executed via the bank network and/or a network connection. It should further be understood that the architecture 210 as presented is for purposes of illustration only, and other embodiments may utilize different or additional processes and steps, a different ordering of these steps, or omit one or more steps shown.

Figure 3:
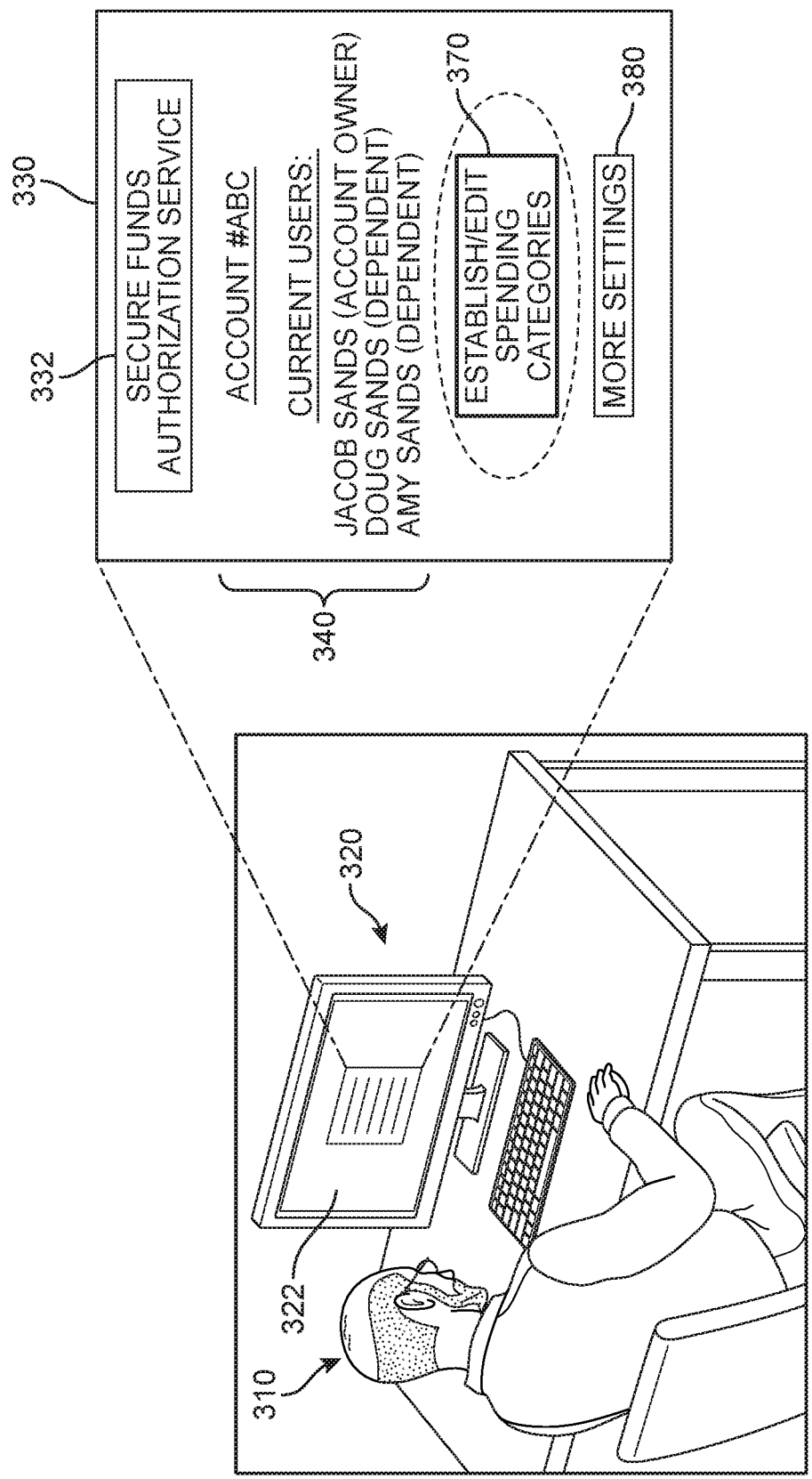
FIG. 3 is an example of a primary account member enrolling in and establishing preferences for the account management system linked to a joint account, according to an embodiment.

For purposes of illustration, an example of a scenario in which an embodiment of the proposed systems may be implemented is shown with reference to FIGS. 3-9. In FIG. 3, an example of an enrollment, registration, or account management portal ("portal") 330 is presented on a display 322 of a first computing device 320 associated with a primary user or account owner 310 (here identified as "Jacob Sands"). The portal 330 in this case presents an interactive menu for service 332 ("Secure Funds Authorization Service") for establishing preferences, conditions, and boundaries desired by the primary user 310. For purposes of illustration, the linked account has been identified as "Account #ABC", and current account holders have been added or identified in an account summary section 340. The account owner "Jacob Sands" (primary user 310) in this example is father of two children, "Doug Sands" and "Amy Sands" who, as shown on the interface provided by portal 330, have been added as dependent users for the account. Additional options can be offered to make modifications or add or delete dependent users and/or add, delete, or modify password or security factors. In FIG. 3, a first option 370 for creating spending categories and policies ("Establish/Edit Spending Categories") is provided, as well as access more service features, preferences, and options (second option 380).

Figure 4:
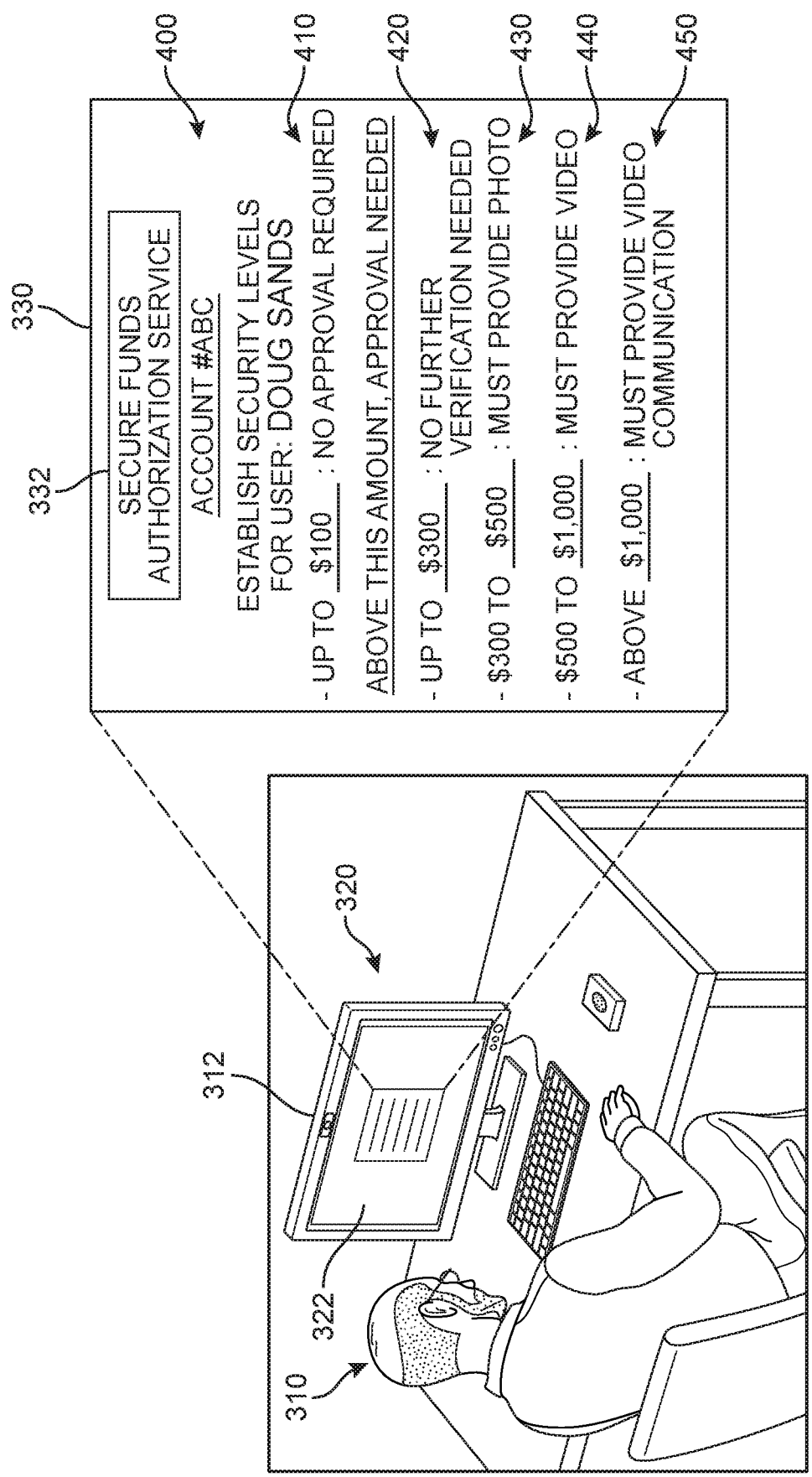
FIG. 4 is an example of the primary member establishing thresholds for spending categories, according to an embodiment.

In different embodiments, the primary user 310 can establish more specific policy settings for the types, amounts, and categories of transactions that may occur in relation to the account. In FIG. 4, the portal 330 now presents a security verification customization menu 400. Although some examples of possible security levels are shown here, it should be understood that these are presented for purposes of illustration only, and the customization menu 400 and any corresponding options, amounts, thresholds, authentication methods, or parameters can vary. In this illustration, it can be seen that a first security level 410 established by the primary user 310 indicates that transactions of up to $100 should be permitted or allowed to occur without any pre-approval. However, transactions above this amount are to be permitted only if approval from the primary user 310 is received. In addition, in some implementations, more specific security levels can be established, as shown in FIG. 4.

For example, a second security level 420 indicates that transactions up to $300 (and above $100) can be approved without any further authentication by the requesting user (i.e., a request form can be submitted on its own and lead to an approval of the requested funds). A third security level 430 indicates that for amounts between $300 and $500, an approval will be accepted only if the requester also provides a real-time (or during a pre-designated window of time following the request) image of the location (see, for example, FIG. 1B) in which the purchase is to occur. A fourth security level 440 indicates that for amounts between $500 and $1000, a request will only be considered if the requesting secondary user provides a real-time (or during a pre-designated window of time following the request) video of the location in which the purchase is to occur; in some embodiments, additional details can be required to be presented in the video, such as the merchant signage, the item(s) and/or barcodes of items to be purchased, price tags, the secondary user present in the video as well, a specific location identifier for the store location, etc. A fifth security level 450 indicates that for amounts between $1000 and $5000, a request will only be considered if the secondary user provides a real-time video-based communication in which the requester explains the purchase, why the purchase is needed, and/or other details that can help the approver make a decision.

The drawings generally depict examples of the implementation of spending categories, in which the primary user has established thresholds that can be used to trigger specific types of verification procedures during the submission of a request for funds by a secondary user. However, it is to be appreciated that the proposed systems and methods also contemplate an application that allows the primary user to, in real-time, respond to a request for funds with a request for a particular verification content, such as a video or image. In other words, in some embodiments, the secondary user may not necessarily trigger a spending category-based verification requirement, but once the primary user reviews the request he or she may nevertheless wish to see such content. The application can be configured to include an option for initiating a request for such verification content in real-time, in response to a pending funds request by a secondary user, regardless of previously established account settings or policies.

Figure 5A:
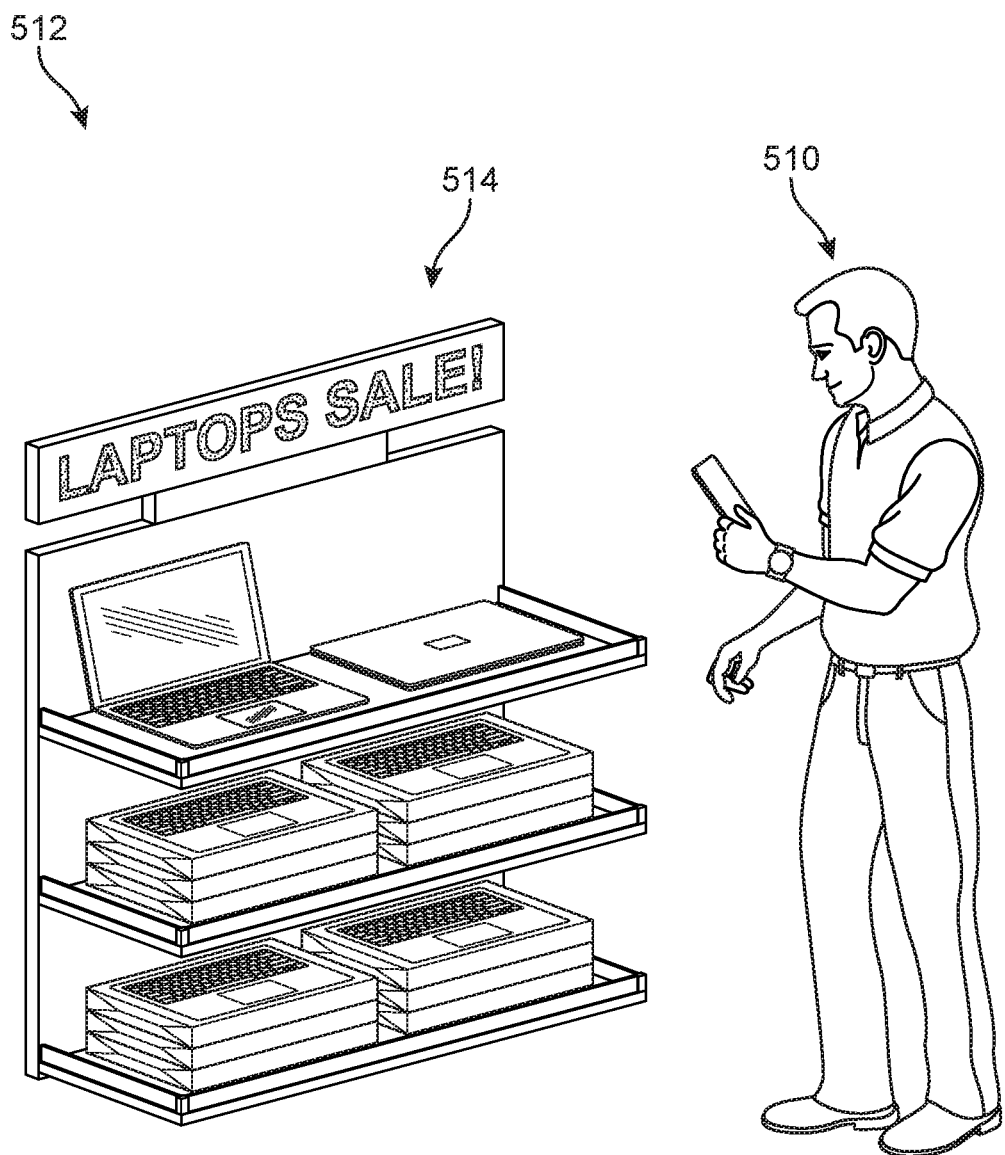
FIG. 5A is an illustration of a secondary account member engaged in a retail shopping experience, according to an embodiment.
Figure 5B:
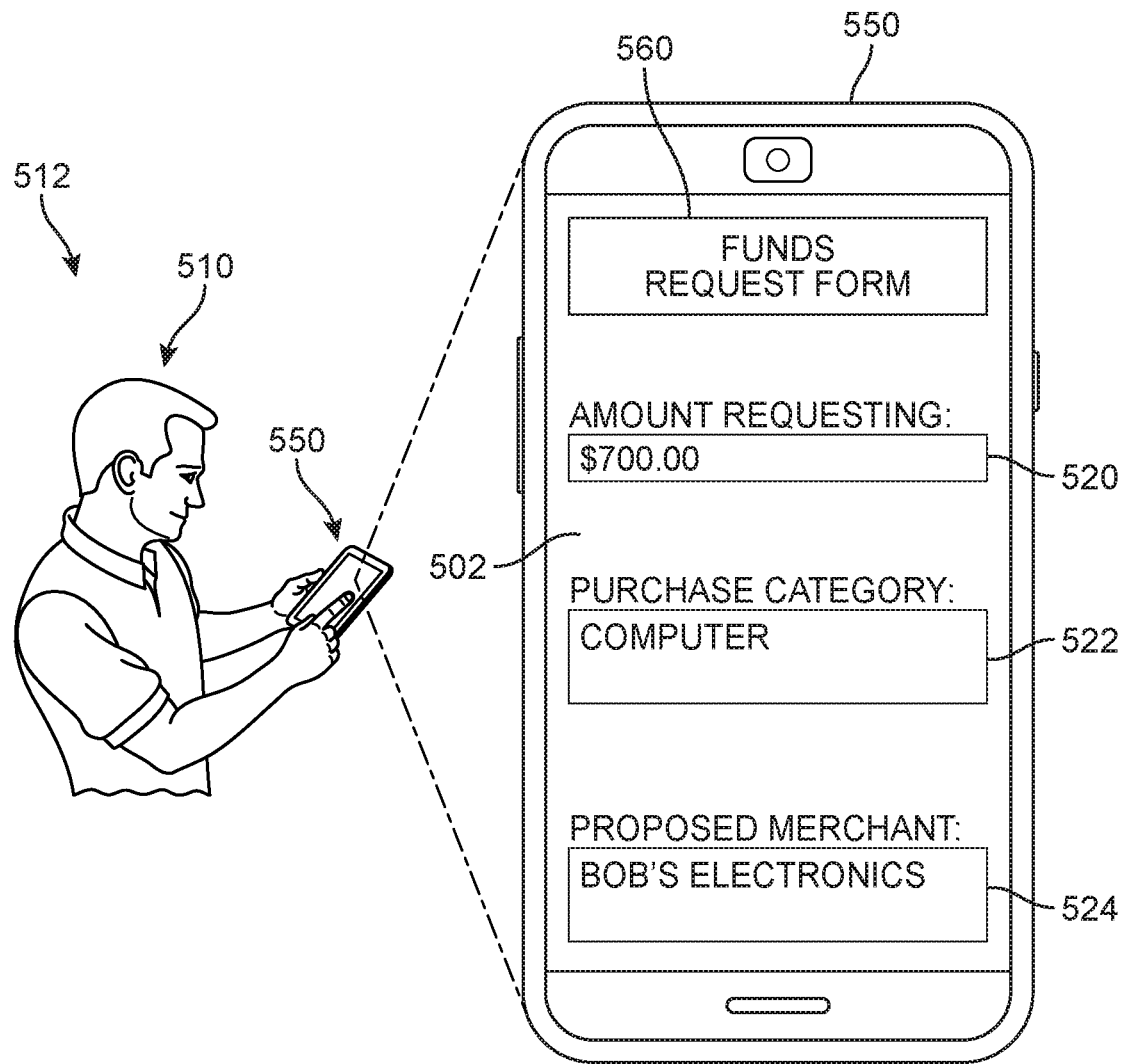
FIG. 5B is an illustration of the secondary account member preparing a fund request message for the desired retail transaction via an account application, according to an embodiment.

In FIG. 5A, a retail environment ("store") 512 is shown in which a secondary user 510 of the joint account being managed by the primary owner of FIG. 3 is shopping. In this case, the secondary user 510 is reaching for a selection of laptops 514 being made available for purchase in the store 512. Moving now to FIG. 5B, once the secondary user 510 has determined what the details of his intended transaction will be, the secondary user 510 can access a fund request form 560 through a client application 502 provided by the account management service, in this case via a mobile device 550. For purposes of this example, the secondary user 510 has entered a first input 520 of "$700.00" as the amount being requested, a second input 522 of "Computer" as the purchase category, and a third input 524 of "Bob's Electronics" as the proposed merchant (i.e., the retailer from whom the secondary user intends to make the purchase). After entering this information (which can differ based on the specific data identified by the primary user as being required for the processing of these types of requests) the secondary user 510 can submit the request via the application 502.

In different embodiments, in particular depending on the spending categories established by the primary user(s) and the details of the proposed transaction, the system can be configured to require that the requester first include additional supporting 'evidence' or inputs before the request can be accepted by the service, herein referred to as digital verification items. In response to the submission of a request exceeding a preestablished threshold, the service can be configured to automatically initiate the capture of an image or video to substantiate or authenticate the request. Some examples of such a process are presented in FIGS. 6A-6C. In FIG. 6A, the secondary user 510 is shown in a 'selfie' outside the merchant location ("BOB'S"), captured as a first digital record 610 by a camera 640 associated with the mobile device 550, that may suffice as a type of supporting image for the purposes of the request. The first digital record 610 is captured in real-time. In other words, in different embodiments, the application 502 can be configured to initiate the image capture process automatically in response to a request that is aligned with a spending category requiring an image, to ensure that the image is taken within a predefined window of time, such as within a few minutes to an hour after initial receipt of the request. In another embodiment—as reflected by the spending categories established in FIG. 4—because the proposed transaction is greater than $500, a video may instead be captured.

Figure 6C:
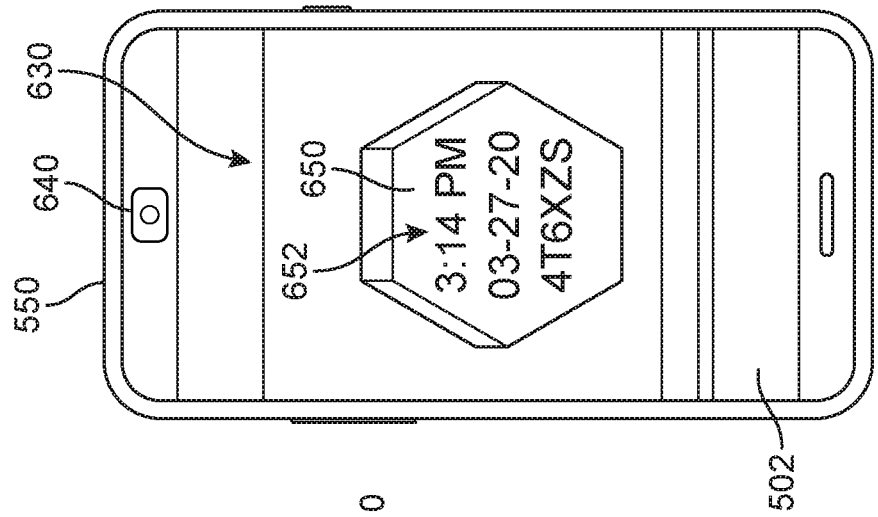
FIGS. 6A-6C are examples of possible types of digital verification items that can be submitted by the secondary user, according to an embodiment.
Figure 6B:
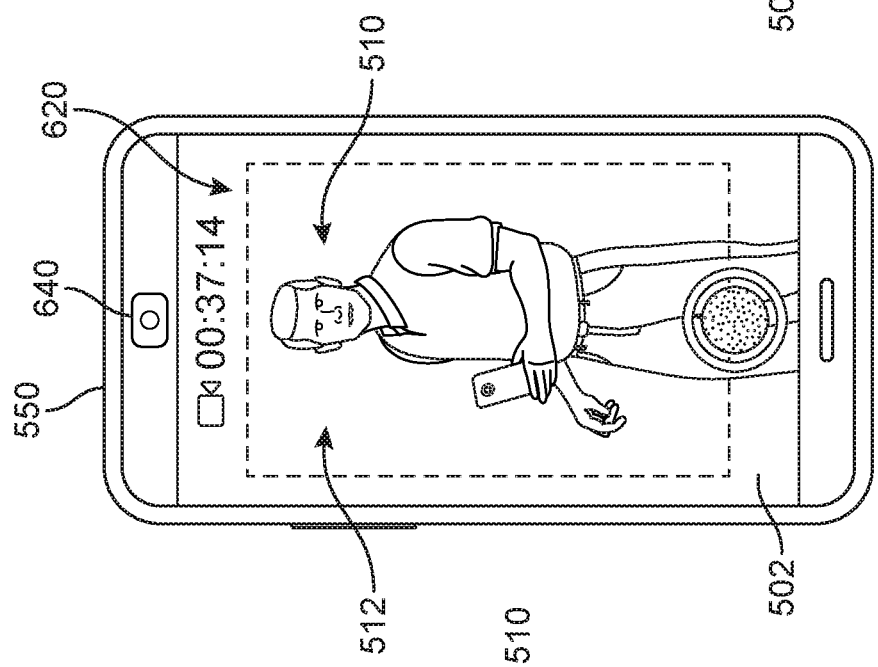
Figure 6A:
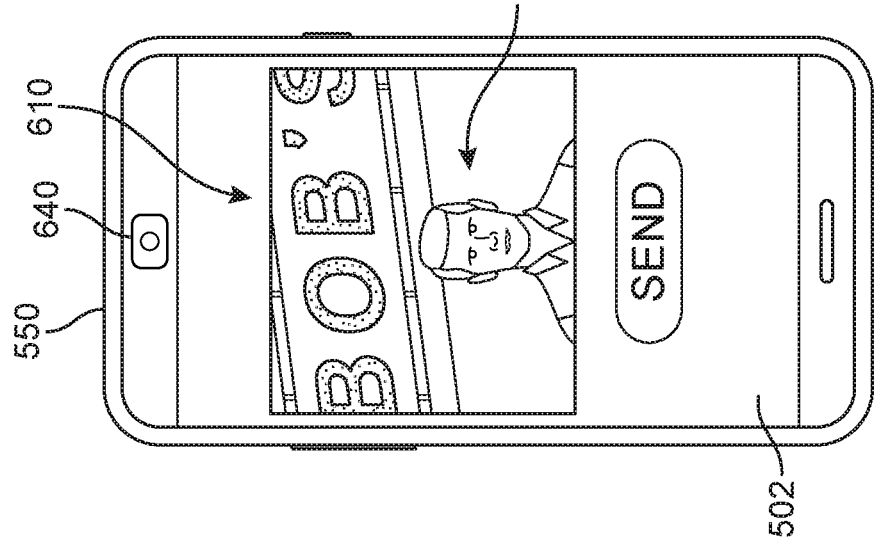

In FIG. 6B, the secondary user 510 is shown taking a video in the store 512, being recorded as a second digital record 620 in real-time following the submission of the request. The second digital record 620 is also captured in real-time, whereby the application 502 is configured to initiate the video recording process automatically in response to a request that is aligned with a spending category requiring a video, to ensure that the video is made within a predefined window of time, such as within a few minutes to an hour after initial receipt of the request. The system can further be configured to add a timestamp or other security information to the image or video to better authenticate the data.

In some alternate embodiments, a merchant or retailer can work in concert with the service. In some cases, the retailer can provide a verification station or beacon that can display unique codes, images, icons, symbols, or other patterns or data that can be captured by a user's camera for the purposes of this type of verification process. In other words, upon submission of a request form identifying a participating merchant that triggers the additional authentication step, a secondary user may be required to take a photo of the retail-provided verification beacon. An example of this is shown with reference to FIG. 6C, where an image of a verification beacon 650 has been captured in a third digital record 630. The beacon 650 includes a display of the time, date, and a unique code 652 ("4T6XZS") that is known to the service as corresponding to this retailer location for this specific time. Thus, an image of this type of display can confirm the secondary user is indeed at the location that was identified for the transaction in the request. This information can be automatically detected and processed by the system to ensure that the code is authentic.

Figure 7A:
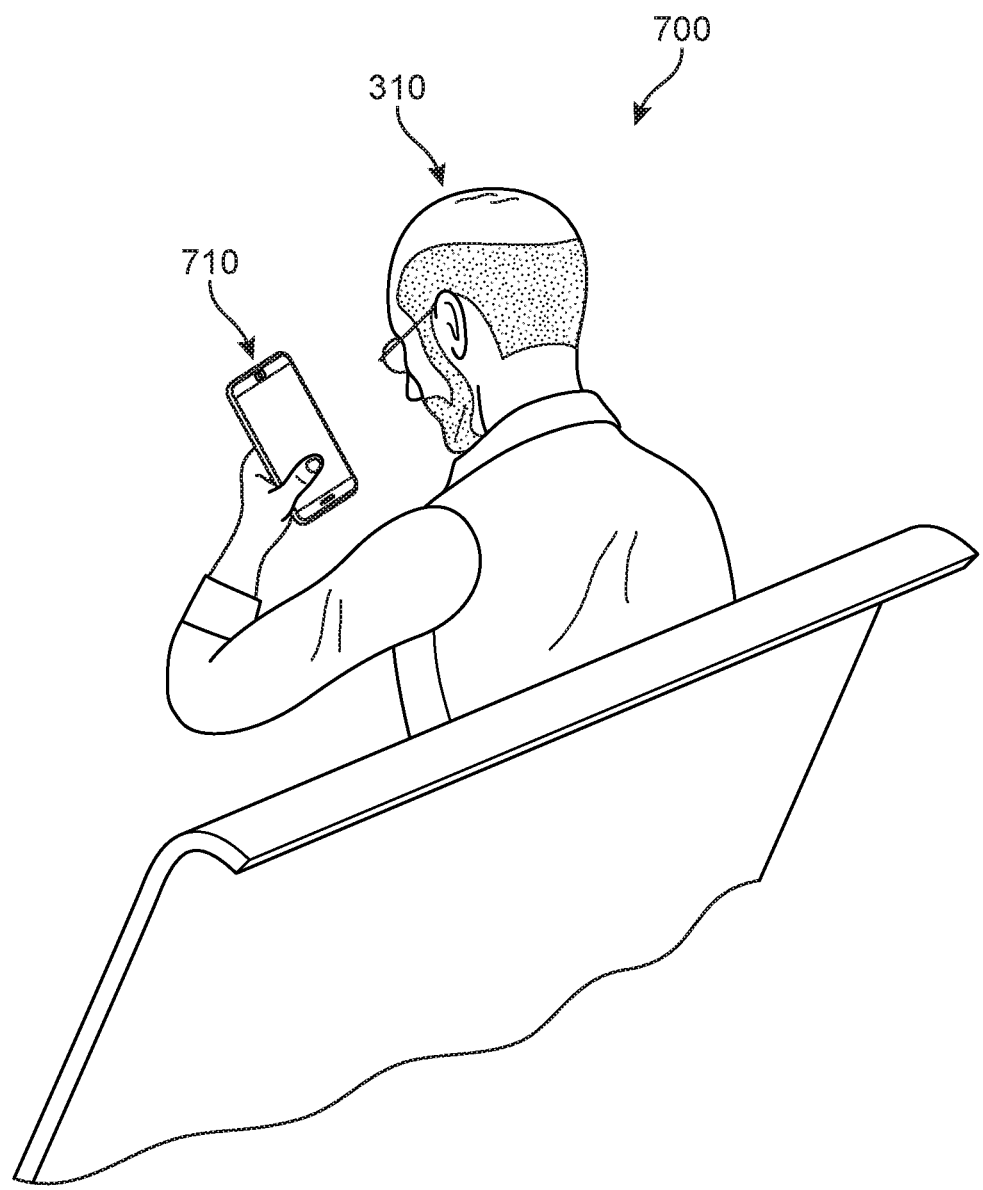

Once the requisite verification data has been received that corresponds to the spending category of the request, the service can process and transmit the request to the designated approver. In FIG. 7A, the approver is primary user 310, who is presented with a message via a personal computing device 710. The message is transmitted in real-time or close to real-time, similar to the delivery of a direct message between mobile phone devices, while the primary user 310 is at a remote location relative to his son (here the father is shown seated at a park 700). It can be appreciated that during the processing of the request, the service can be configured to automatically determine if the funds currently available in the joint account are sufficient for the proposed transaction. If there are insufficient funds to cover the proposed amount, an alert message may also be provided in connection with the request to warn the primary user 310 that approval of this request may trigger an overdraft or a decline of the financial instrument being offered to the merchant.

Two magnified views of the personal computing device 710 are presented in FIG. 7B. In a first stage 780, the application 602 displays a funds request notification interface 712 in which a summary 720 of the request is provided. In addition, the requisite verification data for this type of purchase is also provided (here, as a copy of the second digital record 620). Thus, the primary user is able to easily watch the video or other digital verification item and receive the information conveyed, including but not limited to observable (visual) and auditory details in the video that can indicate the value of the item(s) to be purchased, the quality of said items, verification that the secondary user is indeed at the location he or she has identified as the proposed place of purchase, and/or reasons that may be provided verbally by the secondary user supporting their proposed purchase. The primary user can review this and other information and scroll down or move to a next, second stage 782 in which an interactive menu 730 may be offered to further expedite the review and/or approval process. For example, in this case, the interactive menu 730 asks the primary user "Do you approve this purchase of $700.00 from Account #ABC?" A set of quick response options including a first option 732 ("Yes"), a second option 734 ("No"), and a third option 736 ("Other options") are shown for purposes of illustration. In other embodiments, the options and/or information displayed at the time of the initial notification can vary based on, for example, the user's established preferences.

Figure 8:
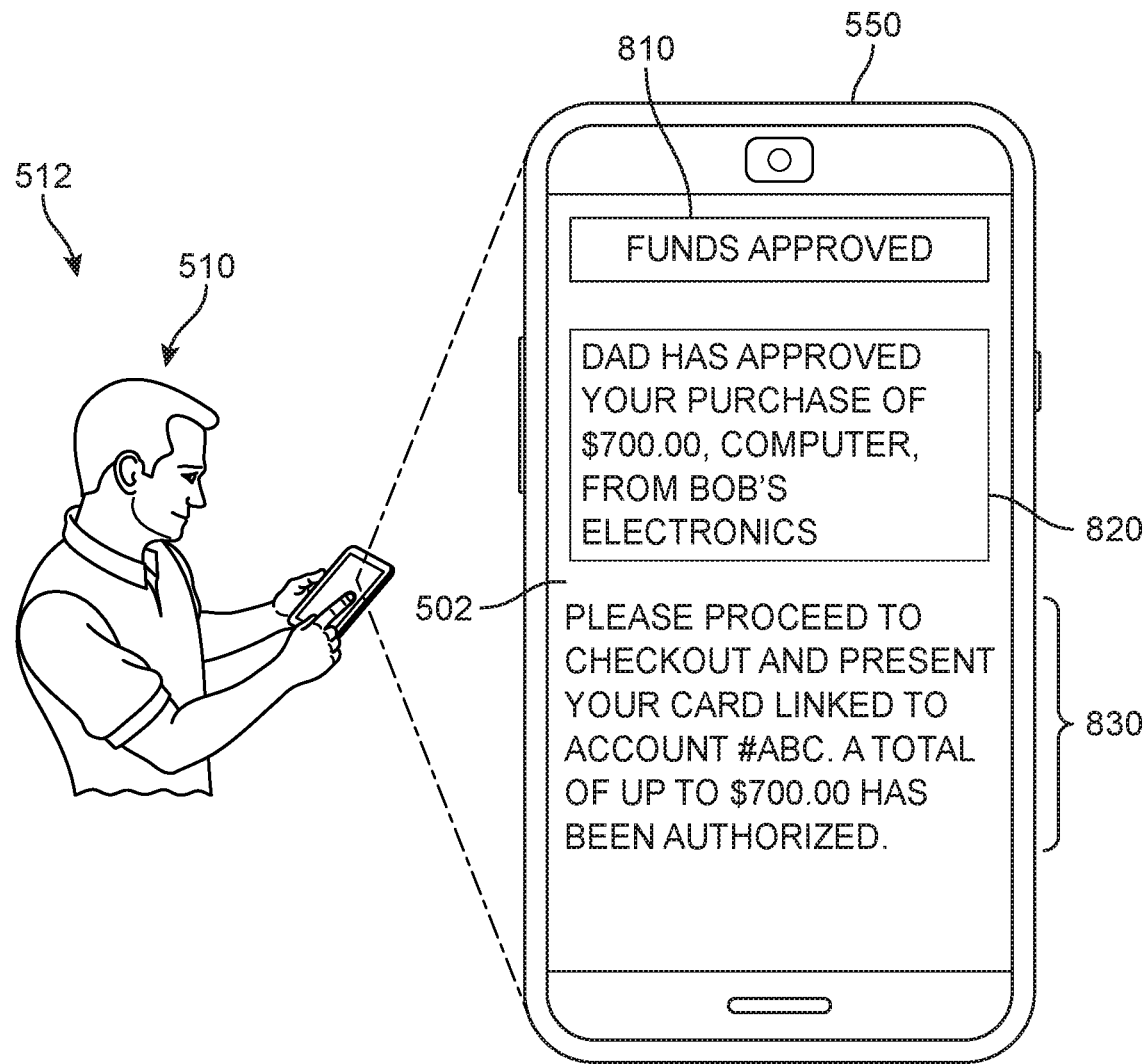
FIG. 8 is an illustration of the secondary account member receiving an approval notification for the proposed transaction, according to an embodiment.

For purposes of this example, the first option 732 of FIG. 7B has been selected. Once the primary user has submitted an approval of the request, the system can be configured to automatically release the designated funds for use by the requesting secondary user. In FIG. 8, the secondary user 510 is shown reviewing an approval notification 810 presented by the application 502 in response to the submitted approval by the primary user. An automatically generated record 820 ("Dad has approved your purchase of $700.00, computer, from Bob's Electronics") setting forth the details of the approved transaction can be shown, as well as automatically generated instructions 830 ("Please proceed to checkout and present your card linked to Account #ABC. A total of up to $700.00 has been authorized").

Figure 9:
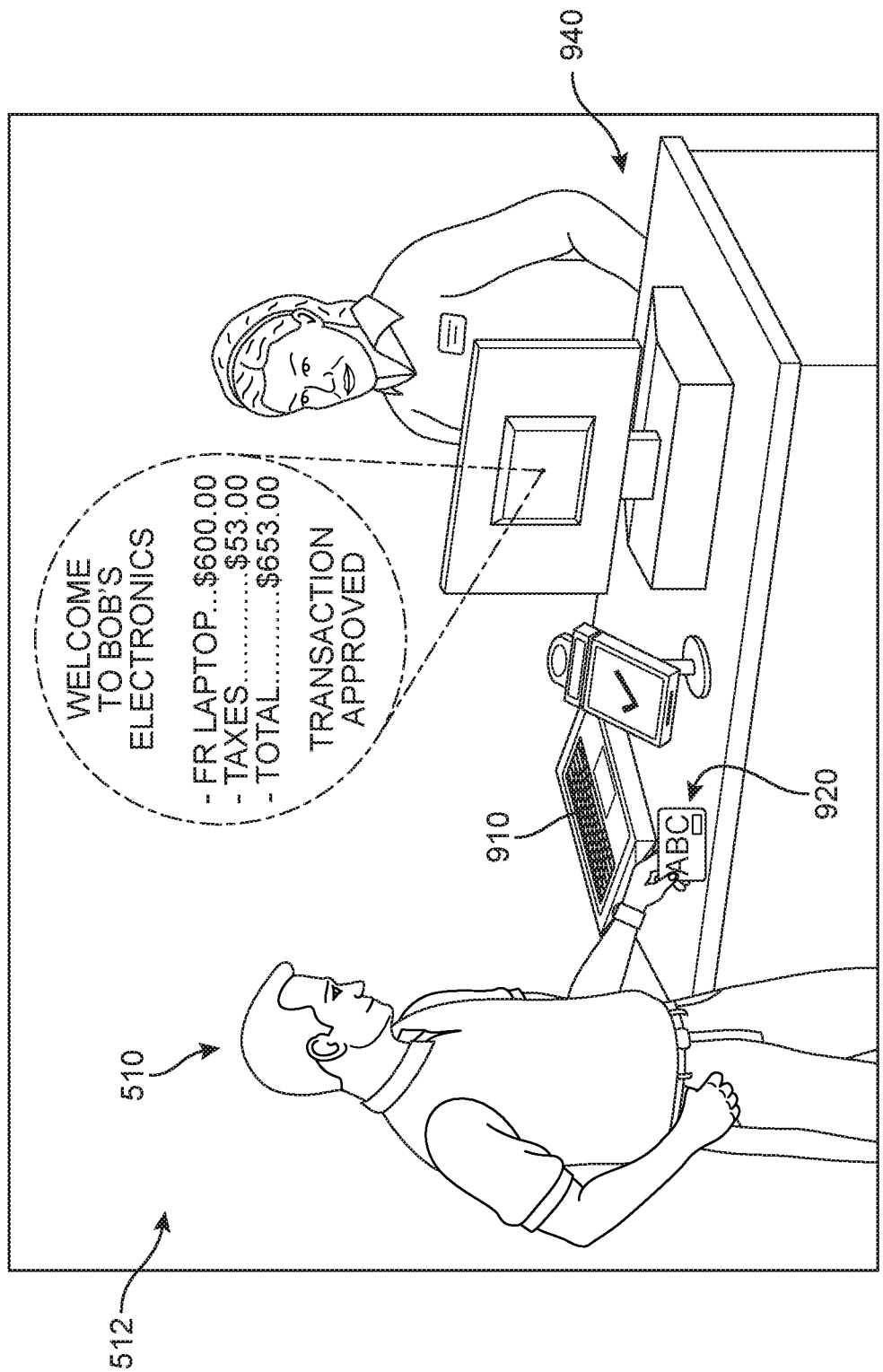
FIG. 9 is an illustration of the secondary account member completing a purchase using funds from the joint account up to the approved amount, according to an embodiment.

With this verification, the secondary user 510 proceeds to a retail checkout station 940 with his selected item 910, as shown in FIG. 9. Upon presentation of an account payment method (here a bank account card 920) for Account #ABC, the secondary user 510 is now able to complete the purchase of item 910. The primary user is thereby able to remain abreast of and retain control over all expenses being charged to his shared account, or at least those expenses he has designated as being of an amount or category requiring his authorization, as well as feel confident that large amounts of funds are being processed only upon the submission by the secondary user of verification data such as images or video related to the proposed transaction.

Figure 10:
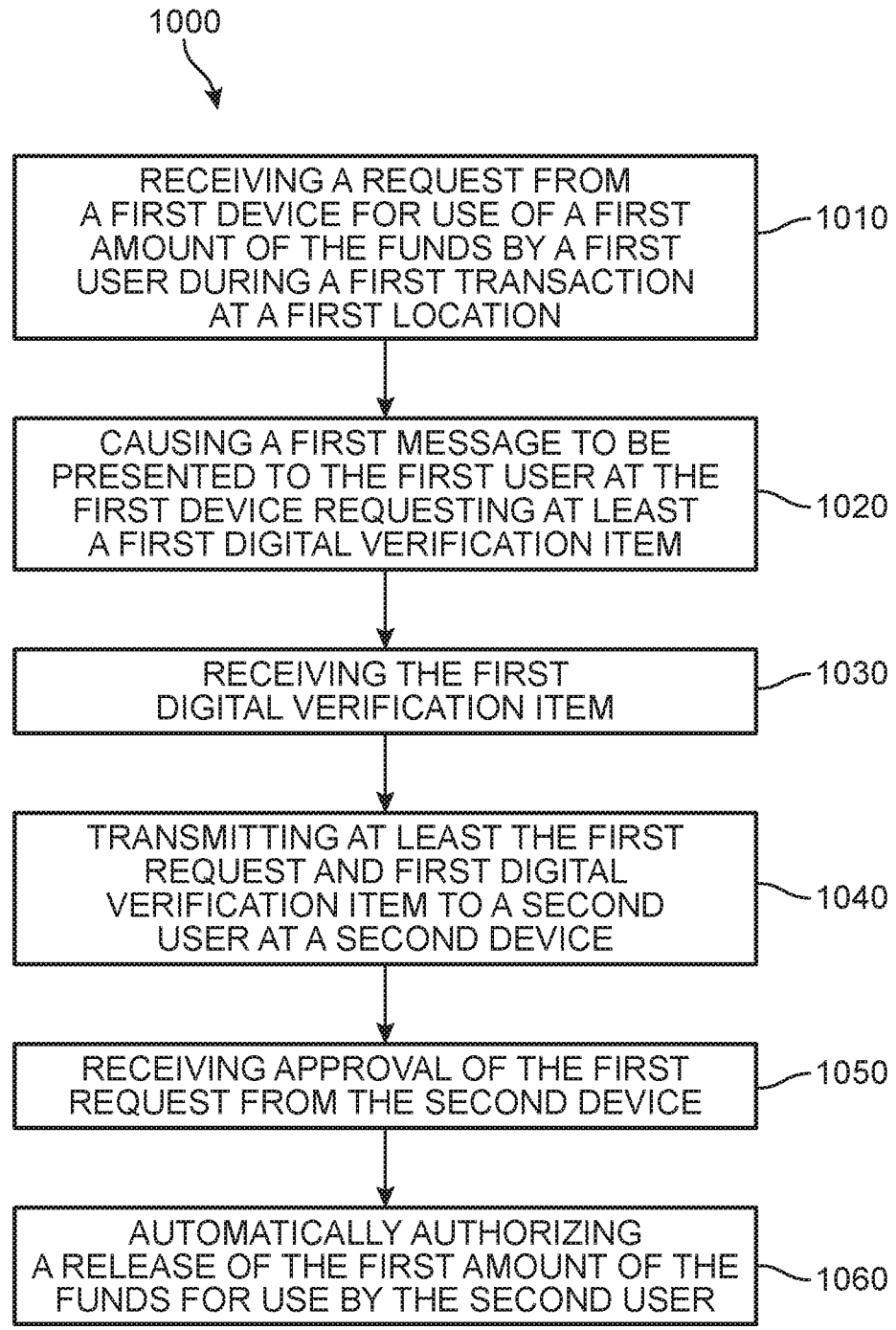
FIG. 10 is a flow chart depicting a process of submitting a request for access to funds held in a bank account along with a digital verification item, according to an embodiment.

FIG. 10 is a flow chart illustrating an embodiment of a method 1000 of increasing security of requests for access to funds held in a bank account. The method 1000 includes a first step 1010 of receiving, from a first user of a first device, a first request for use of a first amount of the funds by the first user during a first transaction at a first location. A second step 1020 includes causing, in response to receiving the first request, a first message to be presented to the first user at the first device requesting at least a first digital verification item, and a third step 1030 includes receiving, from the first device, the first digital verification item. The method 1000 also includes a fourth step 1040 of transmitting at least the first request and first digital verification item to a second user at a second device, and a fifth step 1050 of receiving a first approval of the first request from the second device. Furthermore, the method 1000 includes a sixth step 1060 of automatically authorizing a release of the first amount of the funds for use by the second user in response to receiving the first approval and authenticating the identity of the first user.

In other embodiments, the method may include additional steps or aspects. In some embodiments, the method also includes receiving a registration from the second user linking the bank account to a management service, where the registration indicates a maximum amount of funds that may be used without first obtaining approval. In such cases, the first amount can be greater than the maximum amount, thereby triggering the requirement for an approval to be received before the release of funds can occur or be authorized. In another example, the method can include receiving a registration from the second user linking the bank account to a management service, where the registration indicates a first range of funds that may be approved only upon receipt of a digital verification item. In such cases, the first amount can be understood to be within the first range, thereby triggering the requirement that the first user also provide a digital verification item.

In some embodiments, the first digital verification item is one of an image and a video recording. In such cases, the first digital verification item can also include a visual representation indicating an identity of the first location, such as merchant signage, employee personnel, or retail merchandise items or products. In another embodiment, the method may also include automatically initiating an image capture mechanism via a camera associated with the first device in order to generate the first digital verification item. In such cases, the first message can be presented through an account management application installed on the first device, and the method may further include accepting a digital verification item only if the digital verification item is generated via the account management application. In another example, where the first message is presented through an account management application installed on the first device, the method can also include accepting a digital verification item only if the digital verification item is generated within a first window of time following submission of the first request. The first window of time may be selected or designated by the second user or preset by the system as a default setting. In one embodiment, the first digital verification item is an image of an authentication station that includes a time-based security code. In such cases, the method may also include automatically verifying that the time-based security code is authentic before permitting the first request to be transmitted to the second device. For example, the system may detect the text captured in the image or video and determine whether the code that was photographed matches the code that was to be displayed at that time and location. Merchants who wish to participate can enroll with the service to have the verification beacons installed at their store locations.

In different embodiments, other aspects and features may be included in the proposed system. For example, in some embodiments, the digital verification item may include a live-stream video of the secondary user in the store location, with a requirement by the primary user to explain why the purchase is necessary or desirable. In some cases, the digital verification item may be required by the primary user to also include an image of the item(s) that are being purchased by the secondary user, and/or an image of the price tag and bar code. This information can be scanned by the service to pre-determine whether the items represent a permissible use of the shared funds. In one example, the digital verification item must include a 'selfie' of the secondary user shown within the retail location, or holding the desired merchandise. In some other examples, the digital verification items can be stored in a gallery only accessible to the primary user via the application to allow for later review of purchases (with the bank statement) and also to be able to have an overview of the types of merchandise being purchased by or desired by the secondary user (i.e., each digital verification item record can also include information as to whether the purchase was approved by the primary user) and/or review the frequency of such transactions). Multiple galleries may be generated if there are multiple secondary users attached to the account.

As described herein, purchases by dependents or other secondary users making use of a joint account can be readily monitored and regulated by implementation of the proposed systems. Such a system can reduce the frustrations associated with belated discovery of overdraft penalties, exceeding credit limits, exceeding budgetary guidelines, or otherwise injuring negatively affecting credit scores and reports. A primary user can maintain an accurate, up-to-date accounting of available funds relative to each dependent associated with the account. Such a system may also be used to promote education regarding budgeting and living expenses and may encourage personal responsibility. With the real-time notifications and account controls provided by the disclosed systems, group accounts can be handled with greater awareness and responsibility.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of authorizing a transaction using funds held in a bank account, the method comprising:
    receiving, at a computing system including a processor connected to the bank account and from a first computing device including a camera, a first request for a first amount of the funds by a first user at a first location;
    receiving, at the computing system and from the first computing device, image data captured by the camera;
    detecting in the image data, by the computing system, an image of a verification beacon installed at the first location that visually displays a unique code;
    authenticating, by the computing system and based on the detected unique code, the image data as having been captured while at the first location;
    transmitting, from the computing system and in response to authenticating the image data, at least the first request to a second user at a second computing device;
    receiving, at the computing system and from the second computing device, a first approval of the first request from the second computing device; and permitting, by the computing system and in response to the approval by the second user, use of the funds up to the first amount when the first user requests access to the funds via a merchant payment device around the first location.

2. The method of claim 1, further comprising:
receiving a registration from the second user linking the bank account to the computing system, the registration indicating a maximum amount of funds that may be used without first obtaining approval; and
wherein the first amount is greater than the maximum amount.

3. The method of claim 1, further comprising:
receiving a registration from the second user linking the bank account to the computing system, the registration indicating a first range of funds that may be approved only upon receipt of location data associated with the first user; and
wherein the first amount is within the first range.

4. The method of claim 1, wherein the unique code is known by the computing system as corresponding to the retailer at this specific time.

5. The method of claim 1, wherein the image data includes a display that visually presents the unique code.

6. The method of claim 1, wherein the unique code is recognized by the computing system as corresponding to a first retailer location at the time the image data was captured.

7. The method of claim 1, wherein the verification beacon further presents the current time and date.

8. The method of claim 1,
receiving, from a third device and at the computing system, a second request by a third user for a second amount of the funds at a second location;
receiving, at the computing system and from the third device, a digital verification item;
determining, at the computing system, the digital verification item fails to include features that support authentication; and
automatically blocking, by the computing system, the second request.

9. The method of claim 1, wherein the unique code corresponds to a time-based security code.

10. The method of claim 1, further comprising:
receiving, from a third device and at the computing system, a second request by a third user for a second amount of the funds at a second location;
determining, at the computing system, that the second amount is less than a maximum amount of funds that may be used without first obtaining approval; and
automatically permitting, by the computing system, the second request.

11. A computing system for authorizing a transaction using funds held in a bank account, the computing system comprising a processor and machine-readable media including instructions which, when executed by the processor, cause the processor to:
receive, at the computing system connected to the bank account and from first computing device including a camera, a first request for a first amount of the funds by a first user at a first location;
receive, at the computing system and from the first computing device, image data captured by the camera;
detect in the image data, by the computing system, an image of a verification beacon installed at the first location that visually displays a unique code;
authenticate, by the computing system and based on the detected unique code, the image data as having been captured while at the first location;
transmit, from the computing system and in response to authenticating the image data, at least the first request to a second user at a second computing device;
receive, at the computing system and from the second computing device, a first approval of the first request from the second computing device; and
permit, by the computing system and in response to the approval by the second user, use of the funds up to the first amount when the first user requests access to the funds via a merchant payment device around the first location.

12. The system of claim 11, wherein the instructions further cause the processor to receive a registration from the second user linking the bank account to the computing system, the registration indicating a maximum amount of funds that may be used without first obtaining approval, wherein the first amount is greater than the maximum amount.

13. The system of claim 11, wherein the instructions further cause the processor to:
receive a registration from the second user linking the bank account to the computing system, the registration indicating a first range of funds that may be approved only upon receipt of location data associated with the first user; and
wherein the first amount is within the first range.

14. The system of claim 11, wherein the unique code is known by the computing system as corresponding to the retailer at this specific time.

15. The system of claim 11, wherein the image data includes a display that visually presents the unique code.

16. The system of claim 11, wherein the unique code is recognized by the computing system as corresponding to a first retailer location at the time the image data was captured.

17. The system of claim 11, wherein the verification beacon further presents the current time and date.

18. The system of claim 11, wherein the instructions further cause the processor to:
receive, from a third device and at the computing system, a second request by a third user for a second amount of the funds at a second location;
receive, at the computing system and from the third device, a digital verification item;
determine, at the computing system, the digital verification item fails to include features that support authentication; and
automatically block, by the computing system, the second request.

19. The system of claim 11, wherein the unique code corresponds to a time-based security code.

20. A non-transitory computer-readable medium storing software comprising instructions executable by one or more computers which, upon such execution, cause the one or more computers to:
receive, at a computing system connected to the bank account and from a first computing device including a camera, a first request for a first amount of the funds by a first user at a first location;
receive, at the computing system and from the first computing device, image data captured by the camera;
detect in the image data, by the computing system, an image of a verification beacon installed at the first location that visually displays a unique code;

authenticate, by the computing system and based on the detected unique code, the image data as having been captured while at the first location;

transmit, from the computing system and in response to authenticating the image data, at least the first request to a second user at a second computing device;

receive, at the computing system and from the second computing device, a first approval of the first request from the second computing device; and permit, by the computing system and in response to the approval by the second user, use of the funds up to the first amount when the first user requests access to the funds via a merchant payment device around the first location.

\* \* \* \* \*